US006707689B2

(12) United States Patent
Momota et al.

(10) Patent No.: US 6,707,689 B2
(45) Date of Patent: Mar. 16, 2004

(54) JUNCTION BOX

(75) Inventors: Atsushi Momota, Ohta (JP); Ichiro Terunuma, Yachiyo (JP); Hideyuki Kosugi, Matsudo (JP); Nobumasa Misaki, Tokyo (JP)

(73) Assignee: Fujikura, Ltd., Tokyo (JP)

( * ) Notice: Subject to any disclaimer, the term of this patent is extended or adjusted under 35 U.S.C. 154(b) by 54 days.

(21) Appl. No.: 10/277,701

(22) Filed: Oct. 23, 2002

(65) Prior Publication Data

US 2003/0076650 A1 Apr. 24, 2003

(30) Foreign Application Priority Data

Oct. 24, 2001 (JP) ....................................... 2001-326153
Oct. 24, 2001 (JP) ....................................... 2001-326154

(51) Int. Cl.$^{7}$ ............................ H02B 1/18; H01H 85/20

(52) U.S. Cl. ........................ 361/833; 361/823; 361/776; 361/785; 439/502; 439/76.2; 439/498; 174/72 A

(58) Field of Search ................................ 361/833, 826, 361/827, 752, 800, 823, 835, 776, 785, 730; 379/397; 174/72 A; 24/164; 439/502, 76.2, 949, 498

(56) References Cited

U.S. PATENT DOCUMENTS 6,291,770 B1 * 9/2001 Casperson ................ 174/72 A
6,496,377 B1 * 12/2002 Happ et al. ................. 361/739
6,500,025 B1 * 12/2002 Moenkhaus et al. ........ 439/502
6,511,342 B1 * 1/2003 Hein et al. .................. 439/502
2003/0077926 A1 * 4/2003 Terunuma et al. ......... 439/76.2
2003/0077927 A1 * 4/2003 Momota et al. ........... 439/76.2

FOREIGN PATENT DOCUMENTS

JP 10-243526 A 9/1998
JP 2845082 B2 10/1998
JP 11-41753 A 2/1999
JP 11-46426 A 2/1999
JP 3236802 A 9/2001

* cited by examiner

*Primary Examiner*—David Martin
*Assistant Examiner*—Hung Bui
(74) *Attorney, Agent, or Firm*—Sughrue Mion, PLLC

(57) ABSTRACT

There is disclosed a junction box including a junction box main body, a connector portion, and a cable portion which connects the junction box main body to the connector portion. Terminal connecting portions are formed to extend from opposite side edges of a strip portion of a flexible printed circuit constituting the cable portion in a short direction of the strip portion, and are connected to first to third connecting terminals. The third connecting terminal is connected to a desired connecting terminal connecting portion of a circuit distribution wiring circuit of a joint connector, electricity is conducted through a plurality of circuit portions in a desired circuit mode, and a wiring design freedom degree is enhanced.

22 Claims, 15 Drawing Sheets

JUNCTION BOX

CROSS-REFERENCE TO RELATED APPLICATIONS

This application is based upon and claims the benefit of priority from the prior Japanese Patent Applications No. 2001-326153, filed Oct. 24, 2001; and No. 2001-326154, filed Oct. 24, 2001, the entire contents of both of which are incorporated herein by reference.

BACKGROUND OF THE INVENTION

1. Field of the Invention

The present invention relates to a junction box including connecting terminals for electrically connecting a connector, fuse, and the like to a wiring circuit, and particularly to a junction box which is lightweight and thin, can freely change connection positions with outer wiring circuits such as a harness and can enhance a wiring design freedom degree.

2. Description of the Related Art

In general, to branch a wiring of a car or the like, a junction box (J/B) has been used for purposes of space saving and cost reduction. FIG. 14 is a plan view of the junction box, FIG. 15 is a plan view of a bus bar contained in the junction box, FIG. 16 is a sectional view of a part VII of FIG. 14, and FIG. 17 is a sectional view of a part VIII of FIG. 14.

This type of a junction box 101 is constituted of a lower cover 102, a bus bar 103 attached to the lower cover 102, and an upper cover 105 which seals the lower cover and bus bar and to which a connector, fuse, and the like are attached. In the junction box 101, as shown in FIG. 15, the bus bar 103 formed, for example, of a pressed/punched metal plate of copper alloy, aluminum alloy, or the like is used to branch the wiring. Moreover, the junction box 101 also includes a function, for example, of a fuse box, when a fuse 107 is incorporated halfway in the wiring circuit constituted by the bus bar 103.

A connector 107 shown in FIG. 16 is a connector connected to the wiring circuit constituted of the bus bar 103. A connector 105*a* can be connected to the connector 107, when a connecting terminal portion 103*a* formed by bending a tip end of the bus bar 103 upwards by 90° is passed upwards through an upper cover 105 via a through hole 105*b* formed in the cover. Moreover, for a fuse attachment portion 105*c* to which a fuse 108 is attached as shown in FIG. 17, a connecting terminal portion 103*d* is formed by bending the tip end of the bus bar 103 with a slit 103*b* formed therein upwards by 90°, and is passed upwards through the upper cover 105 through a through hole 105*d* formed in the cover. Thereby, the connecting terminal portion can directly be connected to a leg 108*a* for connecting the fuse 108, or can be connected using a so-called female to female (F—F) terminal.

Moreover, as shown in FIG. 18, the bus bars 103 and insulation plates (IP) 109 having functions of supporting and insulating the bus bars 103 are alternately superimposed to form a wiring circuit (multilayered wiring circuit) 110 which has a multilayered structure. A junction box 112 structured to contain the multilayered wiring circuit 110 in a housing for entirely protecting the outside of the circuit as shown in FIG. 19 is frequently used.

However, in the above-described junction box 101, the bus bar 103 is manufactured by punching the metal plate with a die and the wiring circuit is formed. Therefore, when the bus bars 103 having various shapes are manufactured, different dies are required, and much cost is taken. Moreover, the bus bar 103 is formed of a thick metal, a weight of the junction box 101 therefore increases, and there is a problem that it is difficult to thin the junction box 101. Furthermore, in the junction box 112, the number of layers of the multilayered wiring circuit 110 needs to be minimized in order to prevent the weight and cost of the entire junction box from increasing. Additionally, the multilayered wiring circuit 110 having a small number of layers is used in accordance with a connection mode. For this, a circuit is drawn so as to avoid a wiring circuit of another layer and through holes 111 through which the connecting terminal portions 103*a*, 103*d* are passed, and a long circuit needs to be formed. This causes a problem that it is very difficult to lighten and thin the junction box 112.

Furthermore, when the bus bar 103 is used to form a multilayered wiring circuit having more layers, for example, the type of the bus bar 103 increases, and the cost of a metal mold increases. Therefore, it is difficult to realize a high-density wiring. As a result, a problem occurs that a freedom degree of wiring design of the junction box is restricted.

BRIEF SUMMARY OF THE INVENTION

An object of the present invention is to provide a junction box in which weight saving and thinning are realized and a freedom degree of wiring design can be enhanced.

According to an aspect of the present invention, the object is achieved by providing a junction box comprising: a junction box main body to which an electric component to be connected is attached; a connector portion which connects a connector of an outer wiring circuit and a joint connector of a circuit distribution wiring circuit and is formed separately from the junction box main body; and a cable portion which is constituted of a flexible printed circuit with a circuit portion including a conductor pattern formed on an insulating film, and electrically connects the junction box main body to the connector portion, wherein the flexible printed circuit includes: a strip portion which connects the junction box main body to the connector portion; and a terminal connecting portion extending from a side edge of a position of the strip portion in which the junction box main body and connector portion are arranged in a short direction of the strip portion, the junction box main body includes: a junction box housing including a component attachment port to which the electric component to be connected is attached; and a plate-shaped first connecting terminal which is connected to the terminal connecting portion of the flexible printed circuit and contained in the junction box housing so as to be connected to the electric component to be connected, and the connector portion includes: a connector housing which is engaged with at least one of the connector of the outer wiring circuit and the joint connector of the circuit distribution wiring circuit; a plate-shaped second connecting terminal which is connected to the terminal connecting portion of the flexible printed circuit and contained in the connector housing so as to be connected to the connector of the outer wiring circuit; and a plate-shaped third connecting terminal which is connected to the terminal connecting portion of the flexible printed circuit and contained in the connector housing so as to be connected to the joint connector of the circuit distribution wiring circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described hereinafter with reference to the accompanying drawings.

Figure 1:
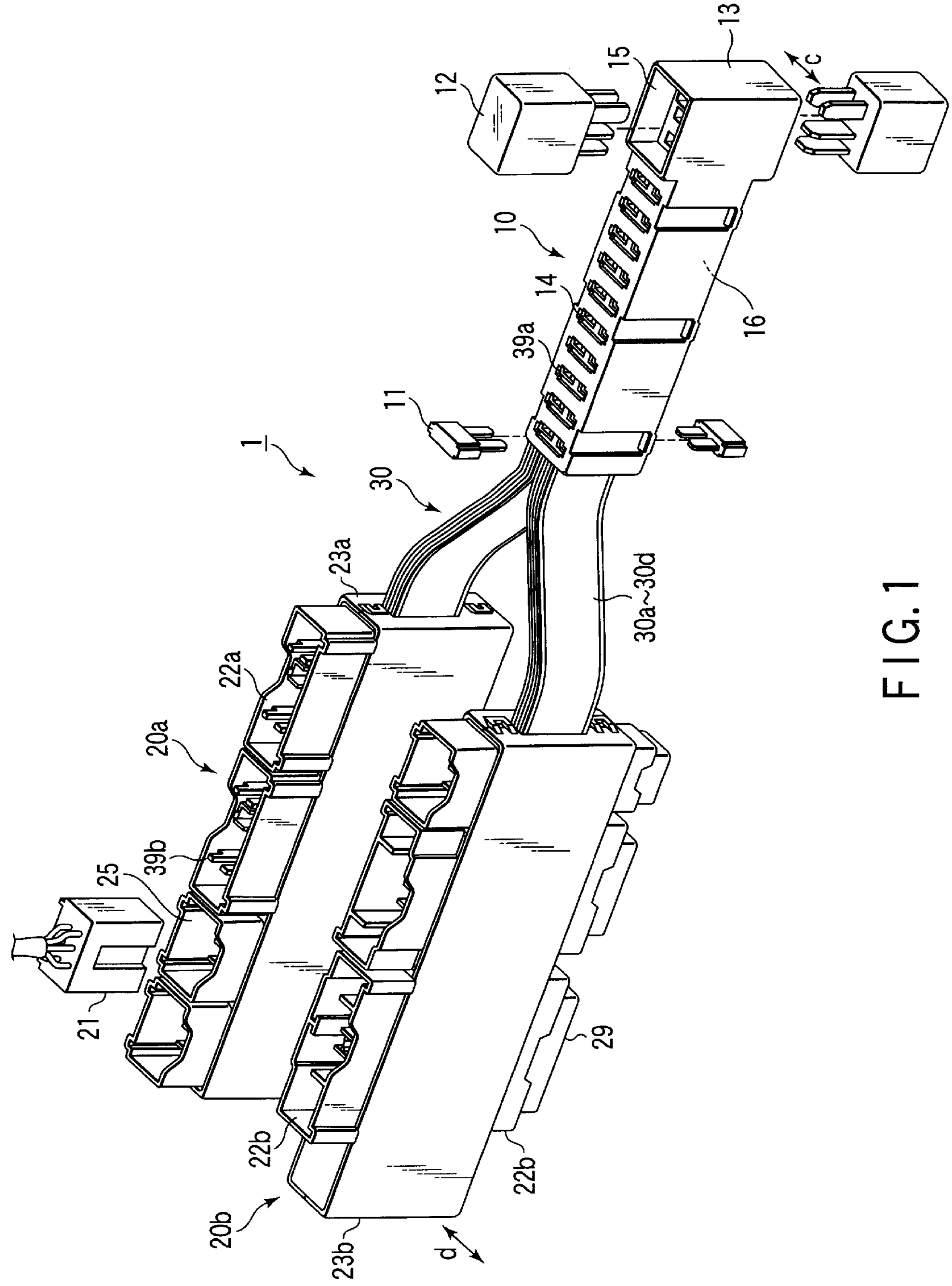
FIG. 1 is a perspective view showing an appearance of a junction box according to one embodiment of the present invention.

FIG. 1 is a perspective view showing an appearance of a junction box according to one embodiment of the present invention.

A junction box 1 is constituted of a junction box main body 10, first connector portion 20*a*, second connector portion 20*b*, and cable portion 30 for connecting the junction box main body 10 to the connector portions 20*a*, 20*b*. The cable portion 30 is formed by freely laminating a plurality of strip-shaped flexible printed circuits (hereinafter abbreviated as "FPC") 30*a* to 30*d* in a non-bonded state. On the other hand, the junction box main body 10 includes a junction box housing 13 formed of a resin molded member and a lid body 16 which is attachable/detachable with respect to the junction box housing 13, and is disposed on one end of the cable portion 30. In the junction box housing 13, in surfaces corresponding to front and rear surfaces) disposed opposite to side edges of the FPCs 30*a* to 30*d*, a plurality of fuse attachment portions 14 and relay attachment portion 15 for attaching a plurality of fuses 11 and relay 12 are formed in one row along a longitudinal direction of the cable portion 30.

First and second connectors 22*a*, 22*b* include connector housings 22*a*, 22*b* formed of resin molded members, and case portions 23*a*, 23*b* in which the connector housings 22*a*, 22*b* are partially contained and which can be divided in a thickness direction of the cable portion 30. The connectors are arranged in the other end of the cable portion 30. The connector housings 22*a*, 22*b* include a plurality of connector engagement portions 25 which are arranged in the surfaces disposed opposite to the side edges of the FPCs 30*a* to 30*d* along opposite side edges of the cable portion 30, and into which a plug connector 21 and joint connector 29 of the circuit distribution wiring circuit are inserted.

Figure 2:
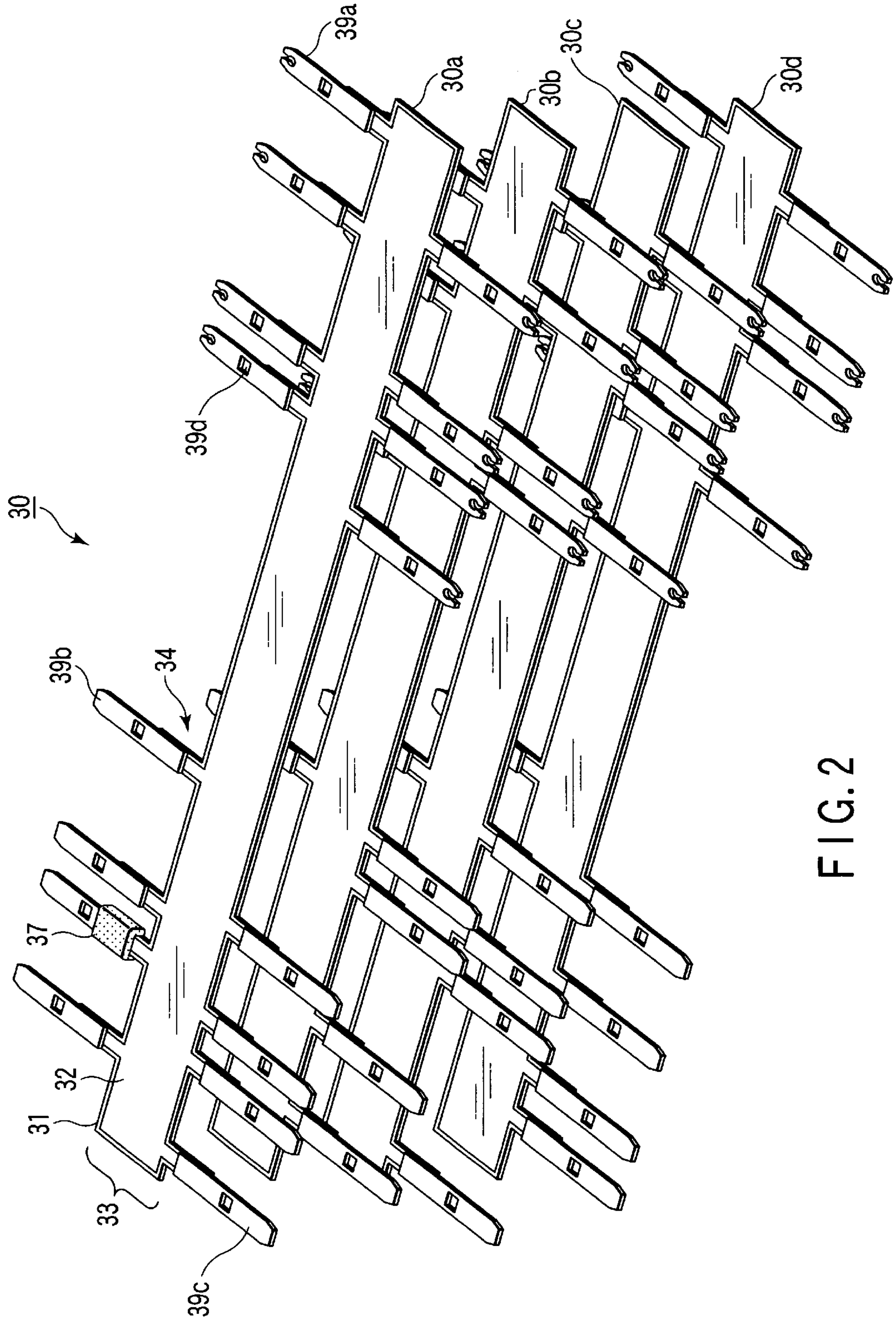
FIG. 2 is an exploded perspective view showing a constitution of a cable portion.

FIG. 2 is an exploded perspective view showing a constitution of the cable portion 30. Additionally, the cable portion 30 may also be constituted of one FPC, but in this example a plurality of FPCs superimposed upon one another in the non-bonded state will be described.

First, each of the strip-shaped FPCs 30*a*, 30*b*, 30*c*, 30*d* constituting the cable portion 30 is constituted by disposing a circuit portion 32 formed by patterning a conductor material such as a copper foil on a base film 31 of an insulating film such as polyethylene terephthalate (PET), polyethylene naphthalate (PEN) and polyimide (PI). If necessary, a cover layer (not shown) is added onto this structure.

A plurality of terminal connecting portions 34 are formed so as to extend from the opposite side edges of a strip portion 33 of each of the FPCs 30*a* to 30*d* by predetermined lengths in a short direction of the strip portion 33. Each tip end of these terminal connecting portions 34 is connected to: a first connecting terminal 39*a* which is contained in the junction box housing 13, constitutes a part of the junction box main body 10, and has a metal plate shape; and second and third connecting terminals 39*b*, 39*c* which are contained in the connector housing 22*a* (22*b*), and constitute a part of the connector portion 20. Additionally, in this example, the first connecting terminal 39*a* is a so-called fork terminal connected to the fuses 11 and relay 12, and the second and third connecting terminals 39*b*, 39*c* are so-called male connecting terminal connected to a female connecting terminal (not shown) of the plug connector 21, or a connecting terminal connecting portion (not shown) of the joint connector 29. Moreover, the terminal connecting portions 34 may also be formed only on one side edge of the strip portion 33. In this case, the connector of the outer wiring circuit, plug connector 21 and joint connector 29 are arranged on the surface of the terminal connecting portion disposed opposite to the side edge of the cable portion 30 on the same side. Moreover, as in the second and third connecting terminals 39*b*, 39*c* of this example, the second and third connecting terminals 39*b*, 39*c* may be formed in the same shape.

In this example, the first connecting terminals 39*a* are connected to the terminal connecting portions 34 formed on opposite side edges of the strip portion 33. The second connecting terminals 39*b* are connected to the terminal connecting portions 34 formed on one side edge of the strip portion 33, and the third connecting terminals 39*c* are connected to the terminal connecting portions 34 formed on the other side edge. Additionally, in the first, second and third connecting terminals 39*a* to 39*c*, engagement holes 39*d* engaged with a lance mechanism disposed in the junction box housing 13 or the connector housing 22*a* (22*b*) as described later are formed. However, the holes may not be formed, when the connecting terminals are not locked/fixed by the lance mechanism.

Figure 3A:
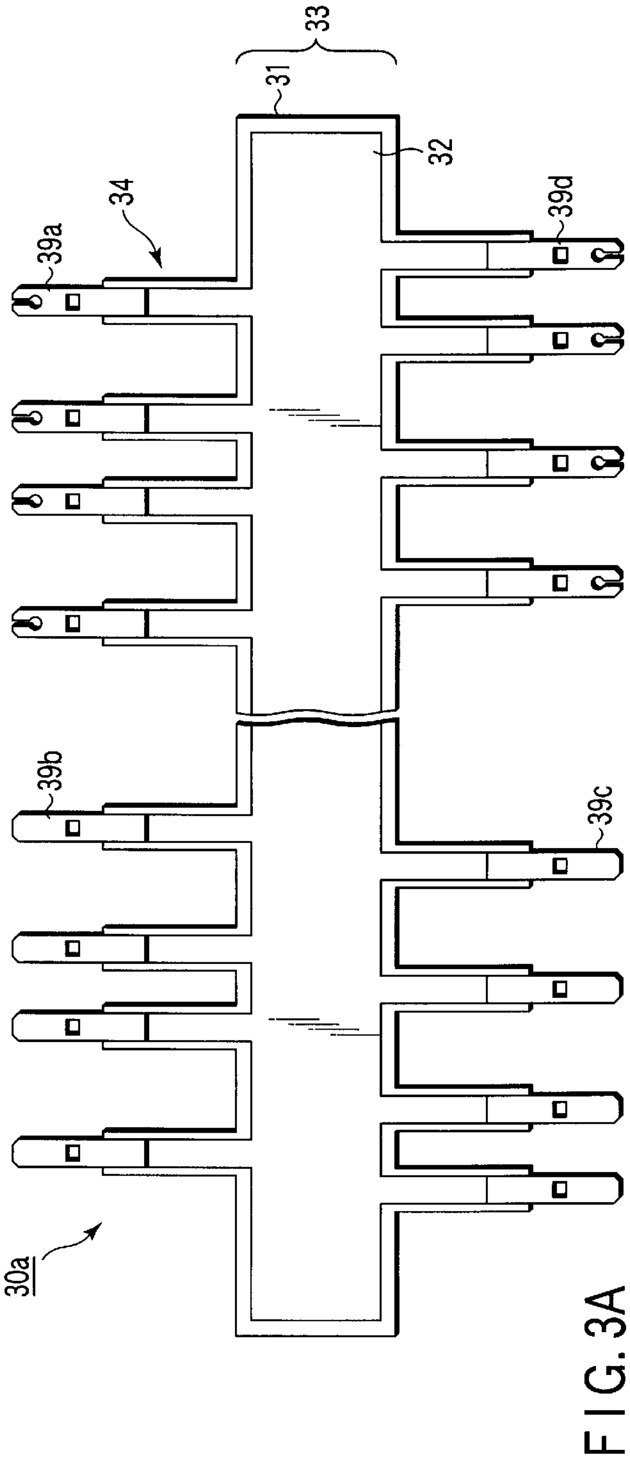
FIGS. 3A and 3B are a top plan view and sectional view of an FPC constituting a part of a cable portion.
Figure 3B:
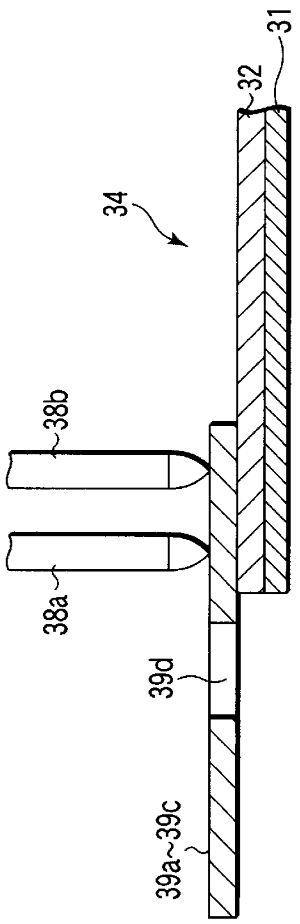

FIGS. 3A and 3B show a top plan view and sectional view of the FPC 30*a* constituting a part of the cable portion 30. As shown in FIG. 3B, the first to third connecting terminals 39*a* to 39*c* are laid on the terminal connecting portions 34 so as to adhere to the circuit portion 32 on the terminal connecting portions 34, subsequently subjected, for example, to resistance welding (series welding) by a pair of electrodes 38*a*, 38*b* of a series welding apparatus (not shown) allowed to abut from above a bonded portion with the circuit portion 32, bonded to the circuit portion 32 and connected to the terminal connecting portions 34. Additionally, since the resistance welding is a known technique, the description thereof is omitted. Additionally, the connecting terminals 39*a* to 39*c* may also be connected to the terminal connecting portions 34 by other methods such as ultrasonic welding, laser welding and soldering. When the terminals are connected to the portions in these connection methods, a high connection reliability can be secured.

After the first to third connecting terminals 39*a* to 39*c* are connected to the terminal connecting portions 34, the FPCs 30*a* to 30*d* are superimposed upon one another and the cable portion 30 is constituted. In this case, the terminal connecting portions 34 of the respective FPCs 30*a* to 30*d* are formed so that the first to third connecting terminals 39*a* to 39*c* are arranged in positions corresponding to connecting terminal arrangement positions of the junction box housing 13 and connector housing 22*a* (22*b*). After the strip FPCs 30*a* to 30*d* are superimposed upon one another to form the cable portion 30 in this manner, for example, a bonded portion of the connecting terminal 39*a* (39*b*, 39*c*) to the terminal connecting portion 34 is sealed by a resin molded portion 37 as shown in FIG. 2. Then, connection reliability of the bonded portion can be enhanced. Moreover, the terminal connecting portions 34 connected to the first to third connecting terminals 39*a* to 39*c* are arranged as such. The first connecting terminals 39*a* are attached to the junction box housing 13 and the second and third connecting terminals 39*b*, 39*c* are attached to the connector housing 22*a* (22*b*) so that the terminals are arranged in predetermined terminal arrangement positions.

Figure 4A:
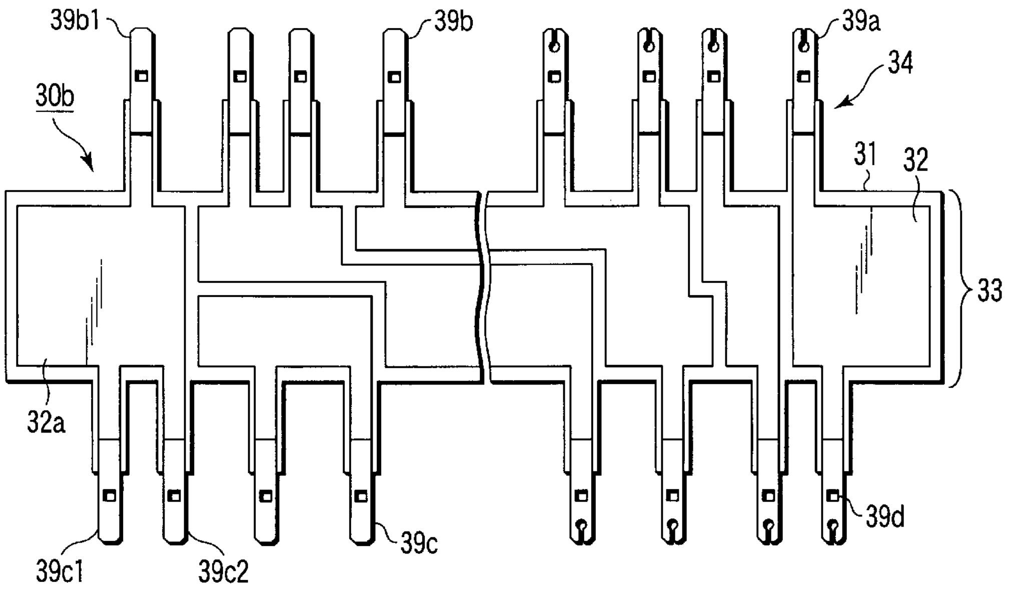
FIGS. 4A and 4B are top plan views of the FPC constituting the part of the cable portion.
Figure 4B:
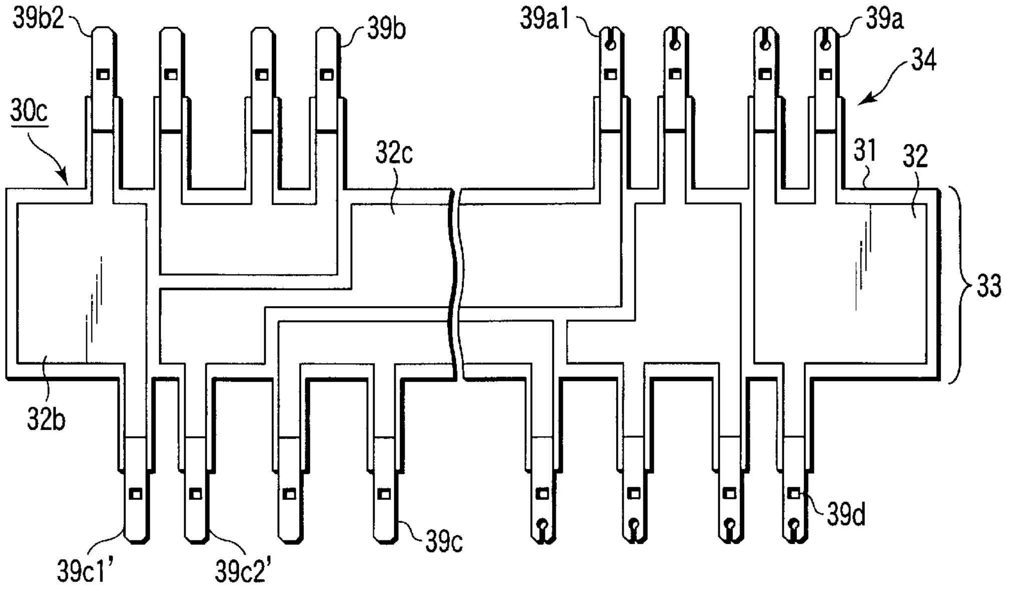

Here, the circuit portion 32 is formed by a so-called solid pattern in the above-described FPC 30*a*. However, for example, when the circuit portion 32 is formed of a plurality of conductor patterns as shown in FIGS. 4A and 4B, a plurality of wiring circuits can be constituted on each of the FPCs 30*a* to 30*d*. Additionally, in the following description, the description of the FPCs 30*a* and 30*d* is omitted, and only the FPCs 30*b* and 30*c* will be described. Contents described hereinafter can be applied to all the FPCs 30*a* to 30*d* constituting the cable portion 30.

As shown in FIGS. 4A and 4B, when the circuit portion 32 is formed so as to include a plurality of conductor patterns, it is possible to construct a plurality of wiring circuits on one FPC 30*b* (30*c*). As a result, the number of FPCs laminated in the non-bonded state can be decreased, and the thinning and weight saving of the cable portion 30 can be promoted.

Figure 5:
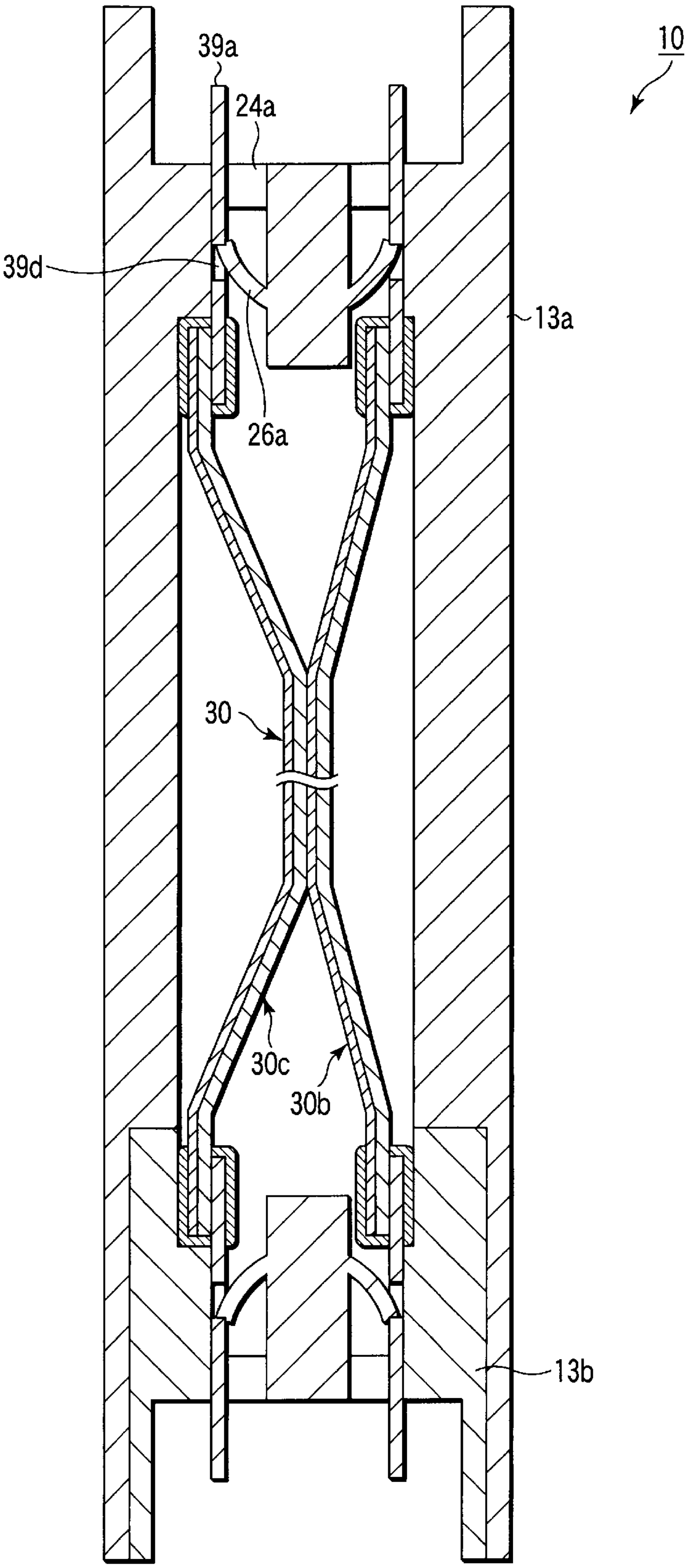
FIG. 5 is a partially sectional view showing that a first connecting terminal is attached to a junction box housing.
Figure 6:
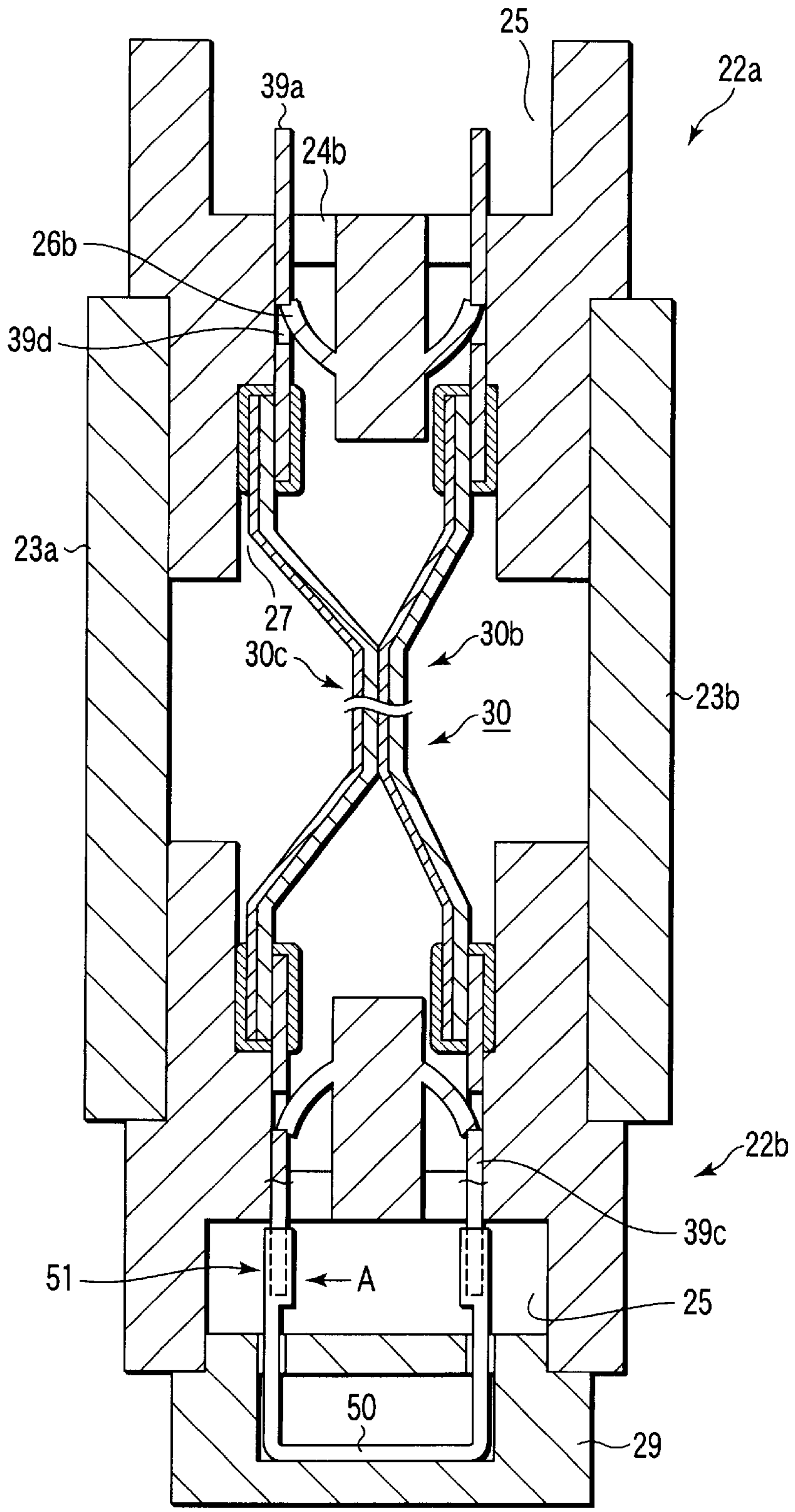
FIG. 6 is a partially sectional view showing that second and third connecting terminals are attached to a connector housing.

FIG. 5 is a partially sectional view showing that the first connecting terminals 39*a* are attached to the junction box housing 13 of the junction box main body 10, and FIG. 6 is a partially sectional view showing that the second and third connecting terminals 39*b*, 39*c* are attached to the connector housing 22*a* (22*b*) of the connector portion 20*a* (20*b*).

As shown in FIG. 5, in predetermined positions of a junction box housing 13*a* (13*b*) of the junction box main body 10, there are formed: terminal containing holes 24*a* through which the first connecting terminals 39*a* are passed and in which the tip ends of the terminals are contained in an exposed state; and lance portions 26*a* as a lance mechanism, which are engaged with the engagement holes 39*d* of the first connecting terminals 39*a* and lock/fix the first connecting terminals 39*a* in both the junction box housings 13*a*, 13*b*. The junction box housings 13*a*, 13*b* are locked by a lock mechanism (not shown), and structured such that the housings can vertically be divided by unlocking the mechanism. The FPCs 30*b*, 30*c* constituting the cable portion 30 are contained in the junction box housings 13*a*, 13*b* while circuit formed surfaces of the circuit portions 32 are longitudinally disposed and the terminal connecting portions 34 are extended as such from the opposite side edges.

On the other hand, as shown in FIG. 6, in the connector housings 22*a*, 22*b*, there are formed: the connector engagement portions 25 which are engaged with the connector of the outer wiring circuit, plug connector 21 and joint connector 29; a plurality of terminal containing holes 24*b* through which the second and third connecting terminals 39*b*, 39*c* are passed and in which the terminals having the tip ends of the terminals projected in the connector engagement portion 25 are contained; and an insertion hole 27 into which the cable portion 30 having the connecting terminals 39*b*, 39*c* passed through the terminal containing holes 24*b* is inserted in the side edge direction of the strip portion 33. In a plurality of terminal containing holes 24*b*, the lance portions 26*b* as the lance mechanism, which are engaged with the engagement holes 39*d* of the connecting terminals 39*b*, 39*c* and lock/fix the connecting terminals 39*b*, 39*c* in the connector housings 22*a*, 22*b* are formed. The terminal connecting portions 34 of the FPCs 30*b*, 30*c* constituting the cable portion 30 are contained in the insertion holes 27 in the connector housings 22*a*, 22*b* so that the terminal connecting portions constitute the predetermined connecting terminal arrangement positions in a state shown in FIG. 6.

Figure 7:
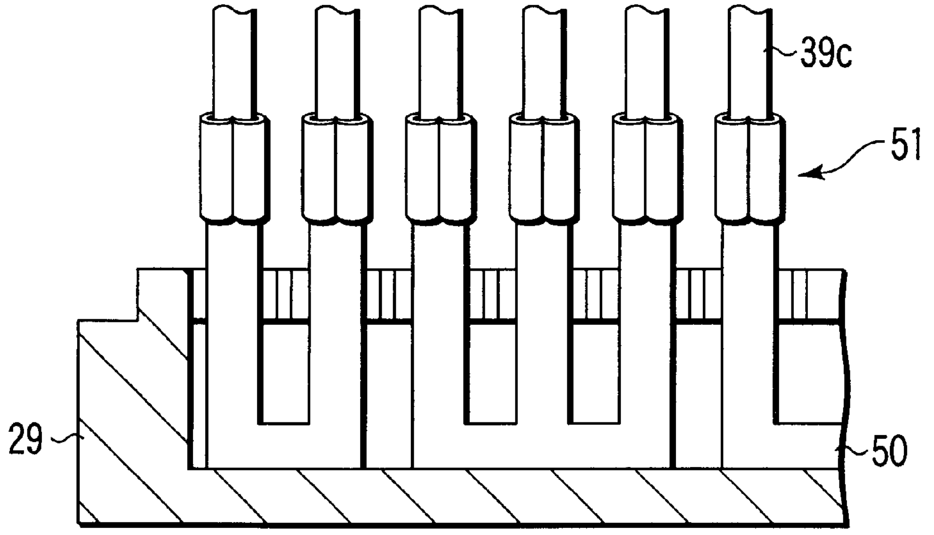
FIG. 7 is a sectional view as viewed from an arrow A of FIG. 6.

In this example, the joint connector 29 including a circuit distribution wiring circuit 50 is engaged in the connector engagement portion 25 of the connector housing 22*b* in which the third connecting terminals 39*c* are contained. Moreover, the third connecting terminals 39*c* in the predetermined positions are connected to a connecting terminal connecting portion 51 disposed in a terminal portion of the circuit distribution wiring circuit 50. As shown in FIG. 7, the circuit distribution wiring circuit 50 of this example is designed to include a bus bar structure formed by punching/processing a predetermined metal plate and subsequently bending/processing the plate. The connecting terminal connecting portion 51 is formed in the terminal portion by the above-described processing method, and the circuit is designed so as to cause a short circuit in the circuit portions 32 which achieve electric conduction of the FPCs 30*b*, 30*c*. Additionally, a circuit distribution wiring circuit including the connecting terminal in the FPC or a circuit distribution wiring circuit formed of a general copper wire can also be applied. The circuit distribution wiring circuit 50 of this example may also be formed so that electricity is conducted among a plurality of circuit portions 32 formed on the same FPC in a predetermined circuit mode, or so that electricity is conducted among a plurality of circuit portions 32 formed on a plurality of FPCs in the predetermined circuit mode. Moreover, the circuit may also be formed so as to realize both modes at the same time.

Since electricity is conducted through the desired circuit portions 32 on the FPCs 30*b*, 30*c* by the circuit distribution wiring circuit 50 of the joint connector 29, a so-called interlayer connection between both the FPCs 30*b*, 30*c* or the wiring circuit formed over the junction box main body 10 and connector portion 20 can freely be changed. For example, as shown in FIG. 4, a third connecting terminal 39*c*1 of the FPC 30*b* is connected to a third connecting terminal 39*c*1' of the FPC 30*c* by the circuit distribution wiring circuit 50 of the joint connector 29. In this case, a second connecting terminal 39*b*1 of the FPC 30*b* is electrically connected to a second connecting terminal 39*b*2 of the FPC 30*c*. Therefore, a circuit portion 32*a* of the FPC 30*b* and a circuit portion 32*b* of the FPC 30*c* can constitute one circuit.

On the other hand, for example, when a third connecting terminal 39*c*2 of the FPC 30*b* is connected to a third connecting terminal 39*c*2' of the FPC 30*c*, the second connecting terminal 39*b*1 of the FPC 30*b* is electrically connected to a first connecting terminal 39*a*1 of the FPC 30*c*. Therefore, the circuit portion 32*a* of the FPC 30*b* and a circuit portion 32*c* of the FPC 30*c* can constitute one circuit. In this manner, the connection mode of the circuit portion 32 can be changed to a desired mode by the circuit distribution wiring circuit 50 of the joint connector 29. Therefore, for example, when interlayer connection is performed, many circuit portions 32 are formed on one FPC 30*b* (30*c*) and this high-density wiring is possible. Moreover, this decreases the number of layers and can promote weight saving. Furthermore, when the connection mode of the circuit portion 32 by the circuit distribution wiring circuit 50 is changed in accordance with various uses, a design of circuit can easily be changed, and a circuit application range can be broadened. Thereby, it can be expected that a freedom degree of wiring design of the junction box is rapidly enhanced.

Figure 8:
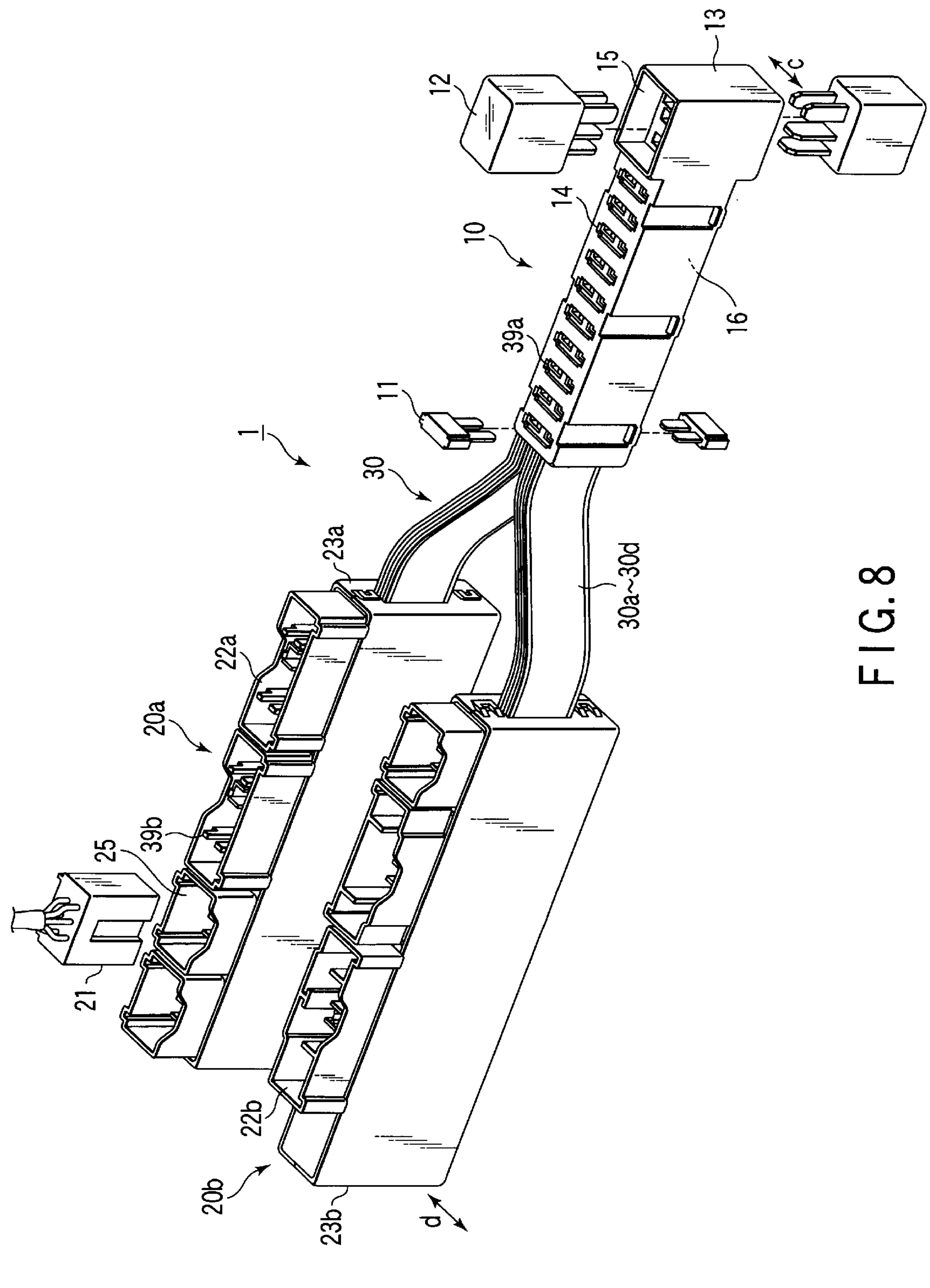
FIG. 8 is a perspective view showing the appearance of the junction box according to another embodiment of the present invention.

FIG. 8 is a perspective view showing the appearance of the junction box according to another embodiment of the present invention. Additionally, duplicate description of the already described portions is omitted hereinafter.

The junction box 1 is constituted of the junction box main body 10, first connector portion 20*a*, second connector portion 20*b*, and cable portion 30 for connecting the junction box main body 10 to the connector portions 20*a*, 20*b*. The cable portion 30 is formed by laminating a plurality of strip-shaped FPCs 30*a* to 30*d* in the non-bonded state and bendable manner. The junction box main body 10 includes the junction box housing 13 and the lid body 16 which is attachable/detachable with respect to the junction box housing 13, and is disposed on one end of the cable portion 30. In the surfaces of the junction box housing 13 disposed opposite to the side edges of the FPCs 30*a* to 30*d*, a plurality of fuse attachment portions 14 and relay attachment portion 15 for attaching a plurality of fuses 11 and relay 12 are formed in one row along the longitudinal direction of the cable portion 30.

The first and second connector portions 20*a*, 20*b* include the connector housings 22*a*, 22*b*, and case portions 23*a*, 23*b* in which the connector housings 22*a*, 22*b* are partially contained and which can be divided in a thickness direction of the cable portion 30. The connector portions are arranged in the other end of the cable portion 30. In this example, the connector housings 22*a*, 22*b* include a plurality of connector engagement portions 25 which are arranged on the surfaces disposed opposite to the side edges of the FPCs 30*a* to 30*d* along one side edge of the cable portion 30, and into which the connector of the outer wiring circuit (not shown) and plug connector 21 are inserted.

Figure 9:
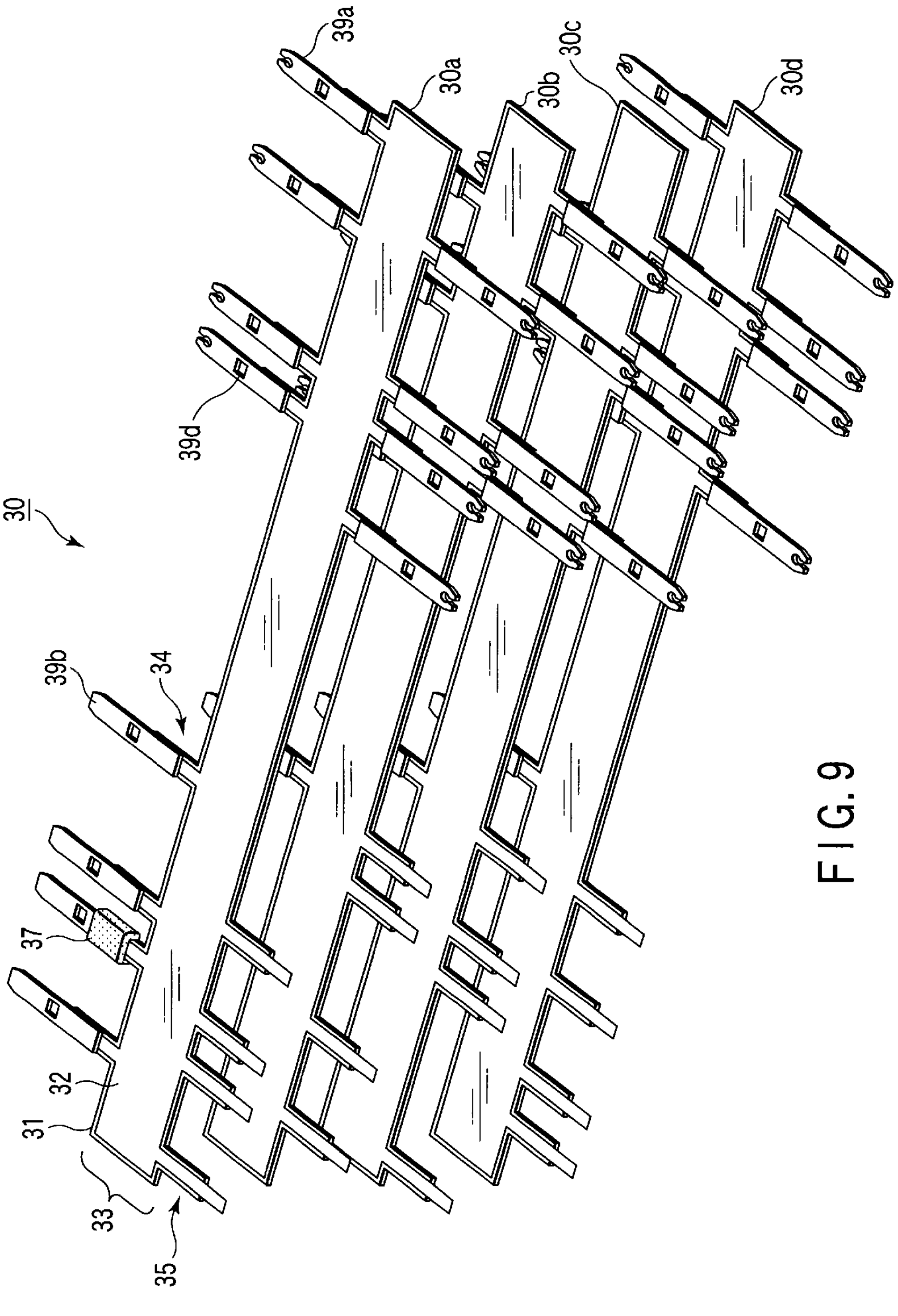
FIG. 9 is an exploded perspective view showing the constitution of the cable portion.

FIG. 9 is an exploded perspective view showing the constitution of the cable portion 30.

First, each of the strip FPCs 30*a*, 30*b*, 30*c*, 30*d* constituting the cable portion 30 is constituted by disposing the circuit portion 32 formed by patterning the conductor material such as the copper foil on the base film 31 of the insulating film such as PET, PEN and PI. If necessary, the cover layer (not shown) is added onto this structure.

A plurality of terminal connecting portions 34 are formed so as to extend from opposite side edges of the strip portion 33 of each of the FPCs 30*a* to 30*d* by predetermined lengths in the short direction of the strip portion 33. Each tip end of these terminal connecting portions 34 is connected to: the first connecting terminals 39*a* which are contained in the junction box housing 13, constitute a part of the junction box main body 10, and have a metal plate shape; and second connecting terminals 39*b* which are contained in the connector housing 22*a* (22*b*) and constitute a part of the connector portion 20. Moreover, a plurality of circuit connecting portions 35 are formed to extend from one side edge of the strip portion 33 of each of the FPCs 30*a* to 30*d* by predetermined lengths in the short direction of the strip portion 33, so that the circuit portion 32 of an extending direction tip end is in an exposed state. Additionally, in this example, the first connecting terminal 39*a* is a so-called fork terminal which is connected to the fuses 11 or the relay 12. The second connecting terminal 39*b* is a so-called male connecting terminal connected to each female connecting terminal (not shown) of the connector of the outer wiring circuit or the plug connector 21. Moreover, the terminal connecting portions 34 may also be formed only on one side edge of the strip portion 33 as in the junction box 1 of this example. In this case, the connector of the outer wiring circuit or the plug connector 21 is disposed in the surface disposed opposite to the side edge of the cable portion 30 on the same side as shown in FIG. 8.

In this example, the first connecting terminals 39*a* are connected to the terminal connecting portions 34 formed on opposite side edges of the strip portion 33. The second connecting terminals 39*b* are connected to the terminal connecting portions 34 formed on one side edge of the strip portion 33. The circuit connecting portions 35 are formed on the side edge on a side opposite to the side edge along which the terminal connecting portions 34 connected to the second connecting terminals 39*b* are formed. Additionally, the engagement holes 39*d* engaged with the lance mechanism disposed in the junction box housing 13 or the connector housing 22*a* (22*b*) as described later are formed in the first and second connecting terminals 39*a*, 39*b*. However, the holes may not be formed, when the lance mechanism does not lock/fix the connecting terminals similarly as described above.

Figure 10A:
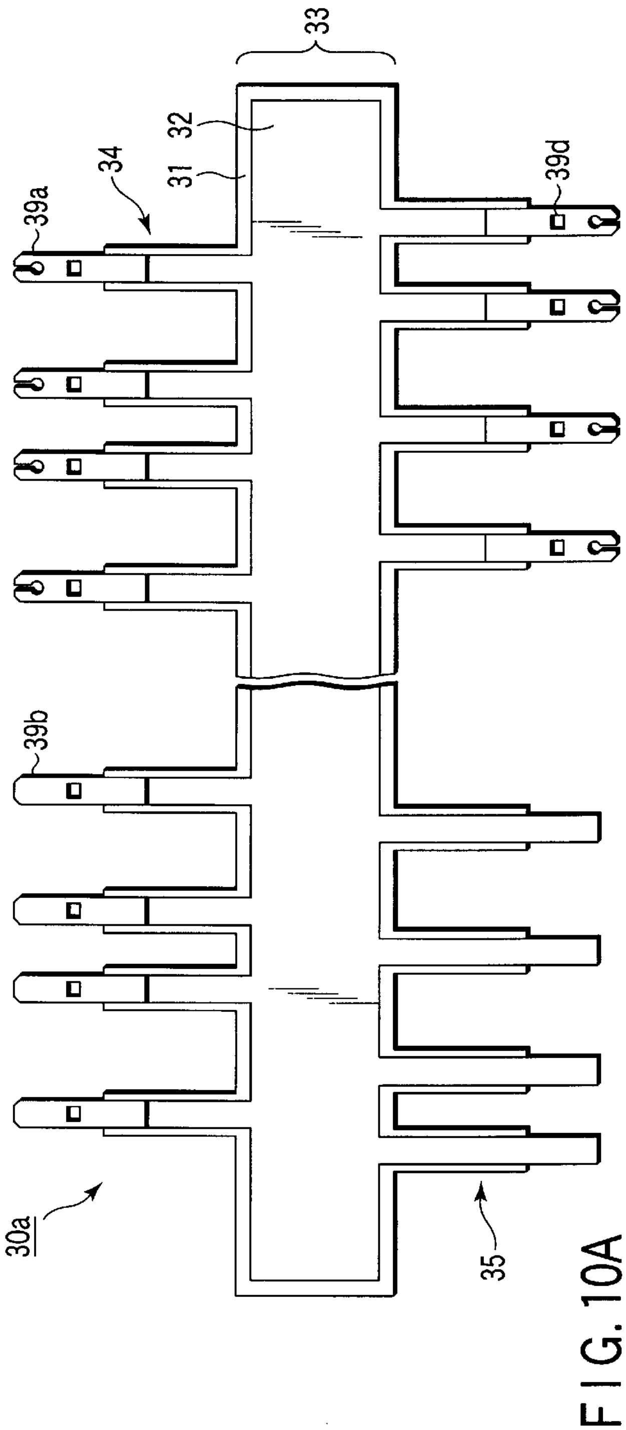
FIGS. 10A and 10B are a top plan view and sectional view of the FPC constituting a part of the cable portion.
Figure 10B:
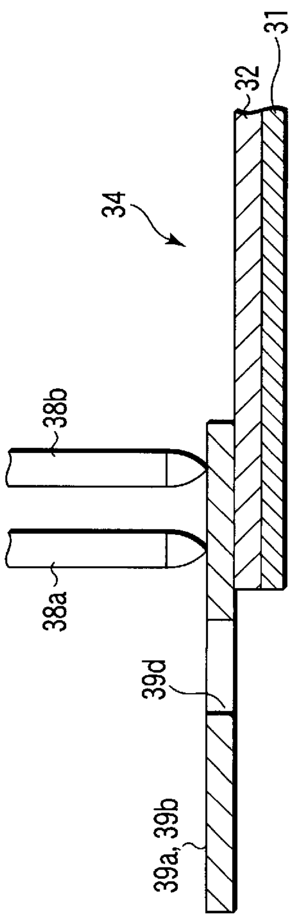

FIGS. 10A and 10B show a top plan view and sectional view of the FPC 30*a* constituting a part of the cable portion 30. As shown in FIG. 10B, the first and second connecting terminals 39*a*, 39*b* are laid on the terminal connecting portions 34 so as to adhere to the circuit portion 32 on the terminal connecting portions 34, subsequently subjected, for example, to the resistance welding (series welding) by a pair of electrodes 38*a*, 38*b* of the series welding apparatus (not shown), bonded to the circuit portion 32 and connected to the terminal connecting portions 34. Additionally, the connecting terminals may also be connected to the terminal connecting portions by the methods other than the above-described resistance welding, such as ultrasonic welding, laser welding and soldering. According to these connection methods, the high connection reliability can be secured.

Figure 11:
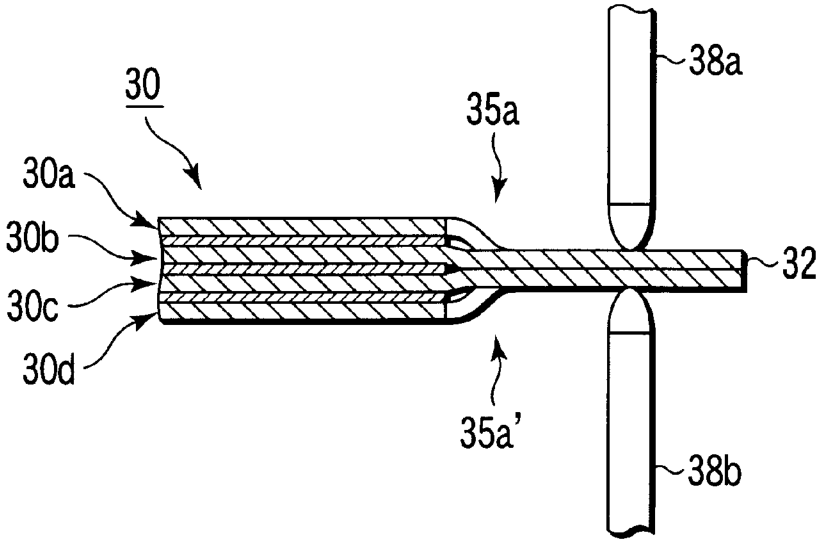
FIG. 11 is a partially sectional view of a connecting portion between circuits.

After the first and second connecting terminals 39*a*, 39*b* are connected to the terminal connecting portions 34, the FPCs 30*a* to 30*d* are superimposed upon one another and the cable portion 30 is formed. In this case, the terminal connecting portions 34 of the respective FPCs 30*a* to 30*d* are formed so that the first and second connecting terminals 39*a*, 39*b* are arranged in the positions corresponding to the connecting terminal arrangement positions of the junction box housing 13 and connector housing 22*a* (22*b*). Moreover, as shown in FIG. 11, the circuit connecting portions 35 (35*a*, 35*a*') of the respective FPCs 30*a* to 30*d* are arranged and formed in the corresponding positions so that the circuit connecting portions 35 superimposed upon one another to constitute the desired circuit portion 32 are laminated in an adhering state in the thickness direction of the FPCs 30*a* to 30*d*. Moreover, as shown in FIG. 11, the circuit portions 32 of the tip ends of the circuit connecting portions 35 of the laminated FPCs 30*b*, 30*c* are allowed to adhere to each other, subjected to the resistance welding by the pair of electrodes 38*a*, 38*b* and bonded to each other. The circuit portion 32 of the FPC 30*b* and the circuit portion 32 of the FPC 30*c* are connected to each other as one circuit.

After the strip FPCs 30*a* to 30*d* are superimposed upon one another to form the cable portion 30 in this manner, for example, the bonded portion of the connecting terminal 39*a* (39*b*) to the terminal connecting portion 34 is sealed by the resin molded portion 37 as shown in FIG. 9. Then, the connection reliability of the bonded portion can be enhanced. Moreover, the terminal connecting portions 34 connected to the first and second connecting terminals 39*a*, 39*b* are arranged as such. The first connecting terminals 39*a* are attached to the junction box housing 13 and the second connecting terminals 39*b* are attached to the connector housing 22*a* (22*b*) so that the terminals are arranged in the predetermined terminal arrangement positions.

Here, the circuit portion 32 is formed by the so-called solid pattern in the FPC 30*a* shown in FIGS. 10A and 10B. However, for example, when the circuit portion 32 is formed of a plurality of conductor patterns as shown in FIG. 12, a plurality of wiring circuits can be constituted on each of the FPCs 30*a* to 30*d* similarly as the above-described example. Additionally, in the following description, the description of the FPCs 30*a* and 30*d* is omitted, and only the FPCs 30*b* and 30*c* will be described. The contents described hereinafter can be applied to all the FPCs 30*a* to 30*d* constituting the cable portion 30.

As shown in FIG. 12, when the circuit portion 32 is formed so as to include a plurality of conductor patterns, it is possible to construct a plurality of wiring circuits on one FPC 30*b* (30*c*). As a result, the number of laminated FPCs can be decreased, and the thinning and weight saving of the cable portion 30 can be promoted similarly as the above-described example.

The constitution in which the first connecting terminals 39*a* are attached to the junction box housing 13 of the junction box main body 10 is the same as the constitution described with reference to FIG. 5 in the above-described example, and therefore the description thereof is omitted.

Figure 13A:
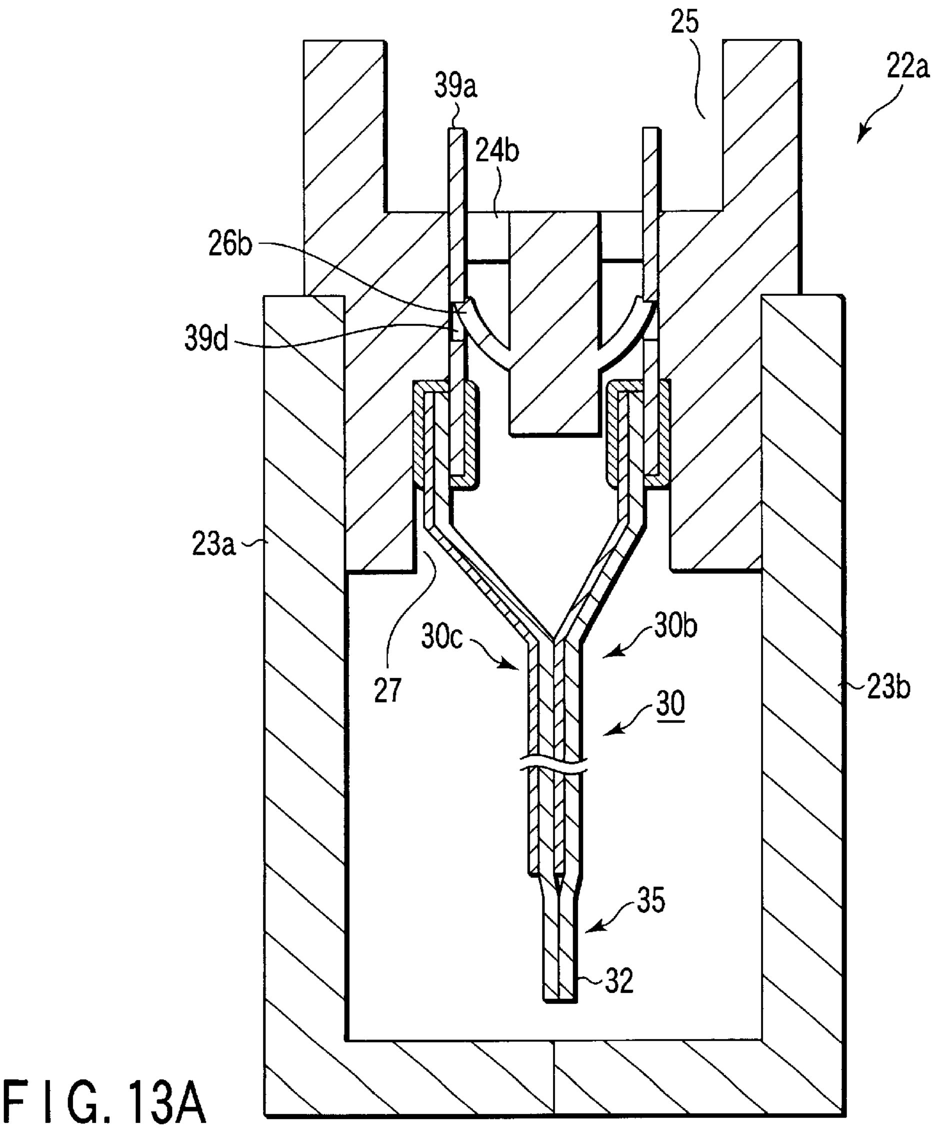
FIGS. 13A and 13B are partially sectional views showing that the second connecting terminal is attached to the connector housing.

FIG. 13A shows partially sectional views showing that the second connecting terminal 39*b* is attached to the connector housing 22*a* (22*b*) of the connector portion 20*a* (20*b*).

As shown in FIG. 13A, in the connector housings 22*a*, 22*b*, there are formed: the connector engagement portion 25 engaged with the connector of the outer wiring circuit or the plug connector 21; a plurality of terminal containing holes 24*b* through which the second connecting terminals 39*b* are passed and in which the tip ends of the terminals projected into the connector engagement portion 25 are contained; and the insertion hole 27 through which the cable portion 30 having the second connecting terminals 39*b* inserted in the terminal containing holes 24*b* is inserted in a side edge direction of the strip portion 33. Inside a plurality of terminal containing holes 24*b*, there are formed lance portions 26*b* as a lance mechanism, which are engaged with the engagement holes 39*d* of the second connecting terminals 39*b* and lock/fix the connecting terminals 39*b* in the connector housings 22*a*, 22*b*. The terminal connecting portions 34 of the FPCs 30*b*, 30*c* constituting the cable portion 30 are contained in the insertion holes 27 in the connector housings 22*a*, 22*b* so that the terminal connecting portions constitute the predetermined connecting terminal arrangement positions in a state shown in FIG. 13A. The strip portions 33 of the FPCs 30*b*, 30*c* are contained in the case portions 23*a*, 23*b* of the connector portions 20*a*, 20*b* together with the circuit connecting portions 35 formed on one side edge.

Figure 13B:
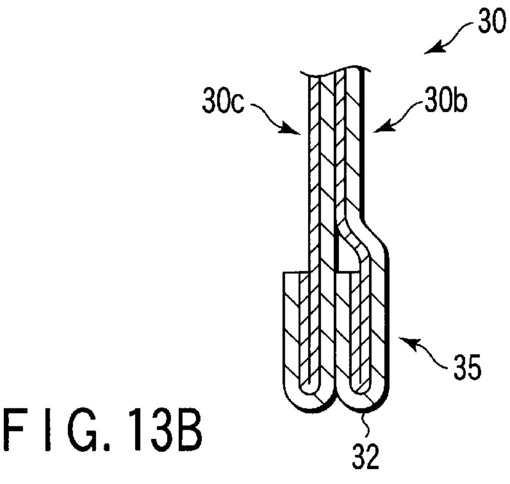
Figure 14:
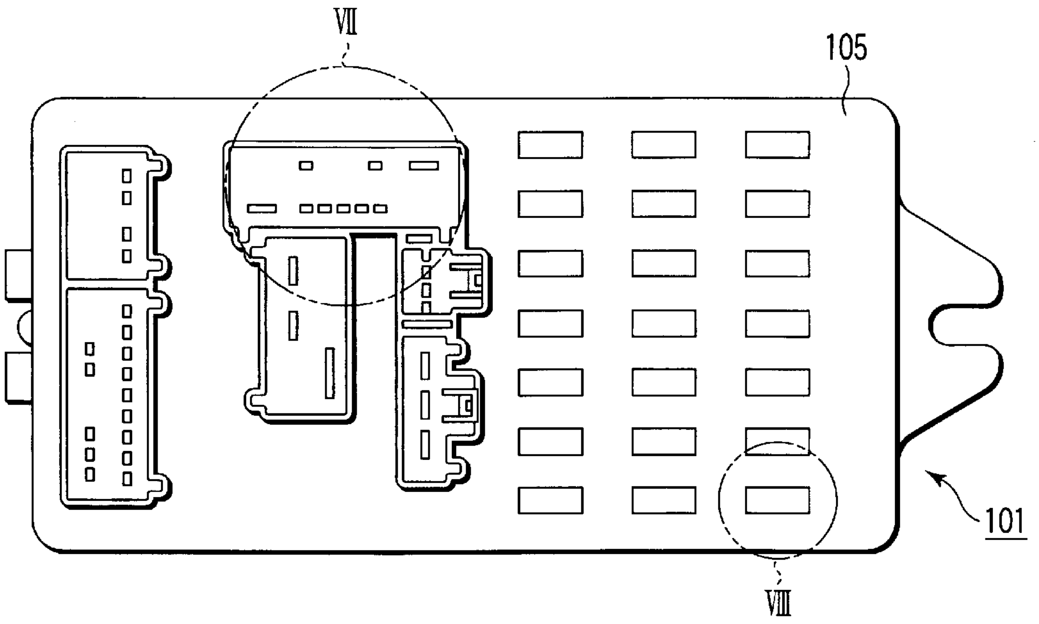
FIG. 14 PRIOR ART
FIG. 14 is a plan view of a conventional junction box.
Figure 15:
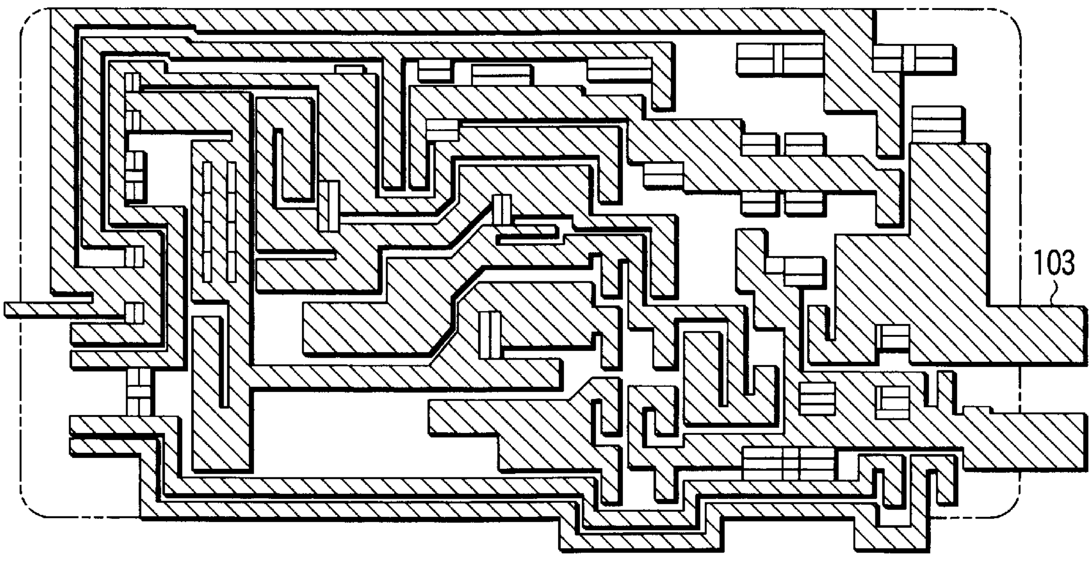
FIG. 15 PRIOR ART
FIG. 15 is a plan view of a bus bar contained in the junction box.
Figure 16:
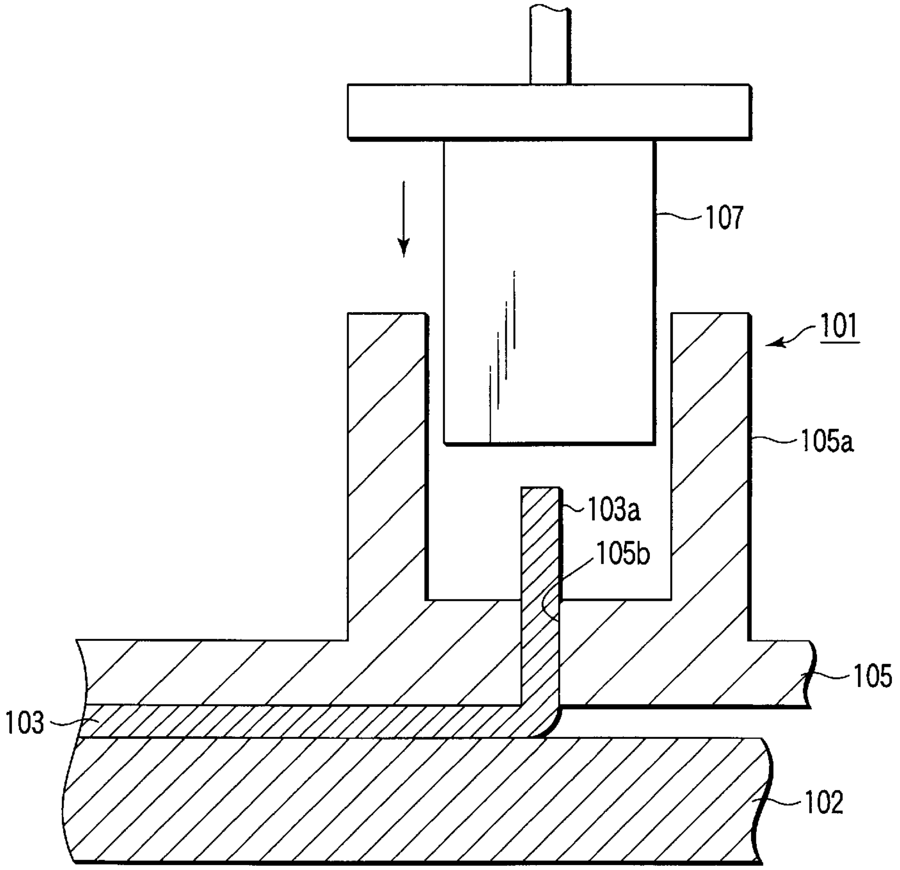
F I G. 16 PRIOR ART
FIG. 16 is a sectional view of a part VII of FIG. 14.
Figure 18:
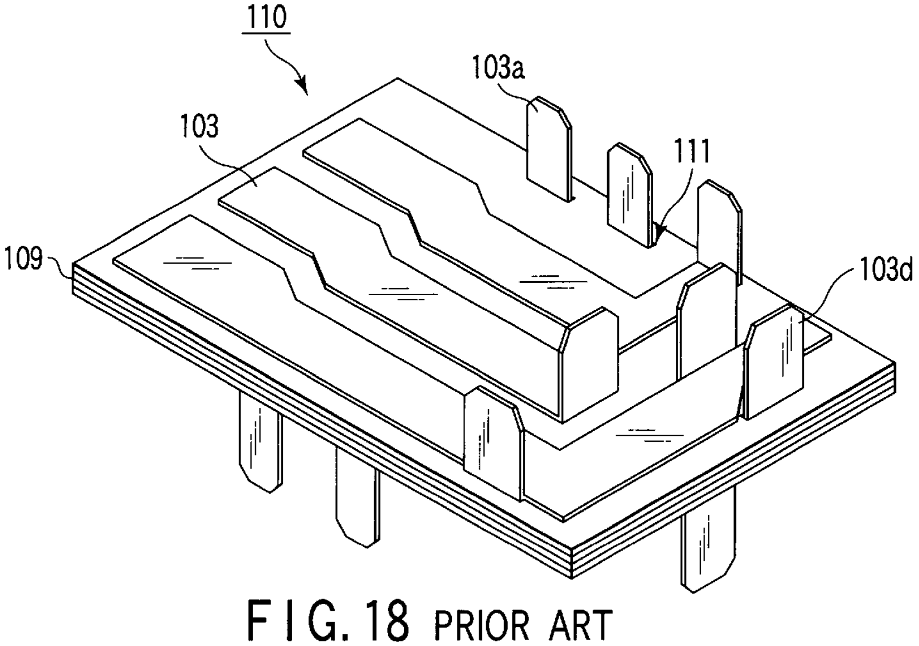
F I G. 18 PRIOR ART
FIG. 18 is an upward perspective view showing a conventional wiring circuit having a multilayered structure.
Figure 17:
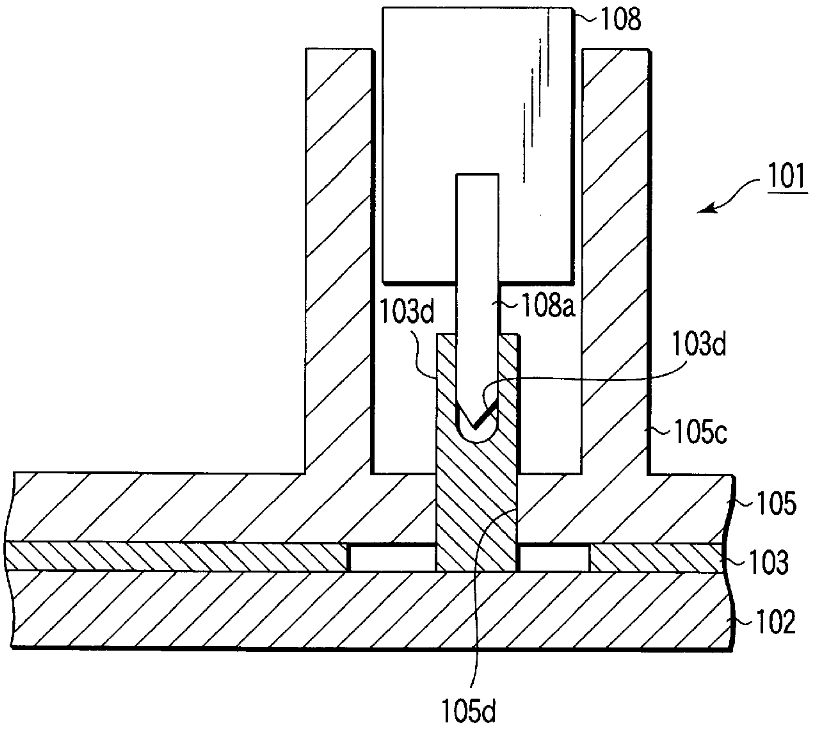
F I G. 17 PRIOR ART
FIG. 17 is a sectional view of a part VIII of FIG. 14.
Figure 19:
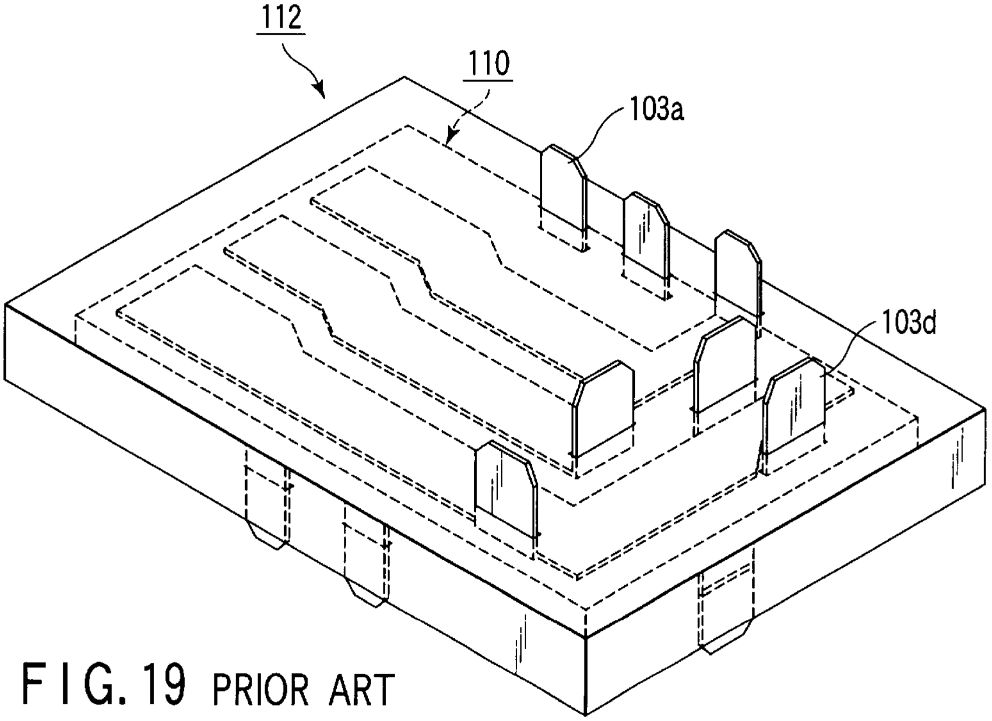
F I G. 19 PRIOR ART
FIG. 19 is an upward perspective view showing the junction box in which the conventional wiring circuit having the multilayered structure is contained.

In this example, the circuit is designed such that the circuit portions 32 for achieving the electric conduction of the FPCs 30*b*, 30*c* cause a short circuit by connecting the circuit connecting portions 35 to one another as described above. The circuit connecting portions 35 may also be formed so that a plurality of circuit portions 32 formed on the same FPC are connected to one another in the predetermined circuit mode, or a plurality of circuit portions 32 formed on a plurality of FPCs are connected to one another in the predetermined circuit mode. Moreover, needless to say, the circuit connecting portions may also be formed so as to realize both requirements at the same time. FIG. 13A shows an example in which the base film 31 is removed only from the tip end of the circuit connecting portion 35, the circuit portion 32 is extended, and the circuit portions 32 of different layers are connected to one another. FIG. 13B shows an example in which the tip ends of the circuit connecting portions 35 are folded back with the circuit portions 32 disposed in the outside, and the circuit portions 32 of the different layers are connected to one another.

Figure 12A:
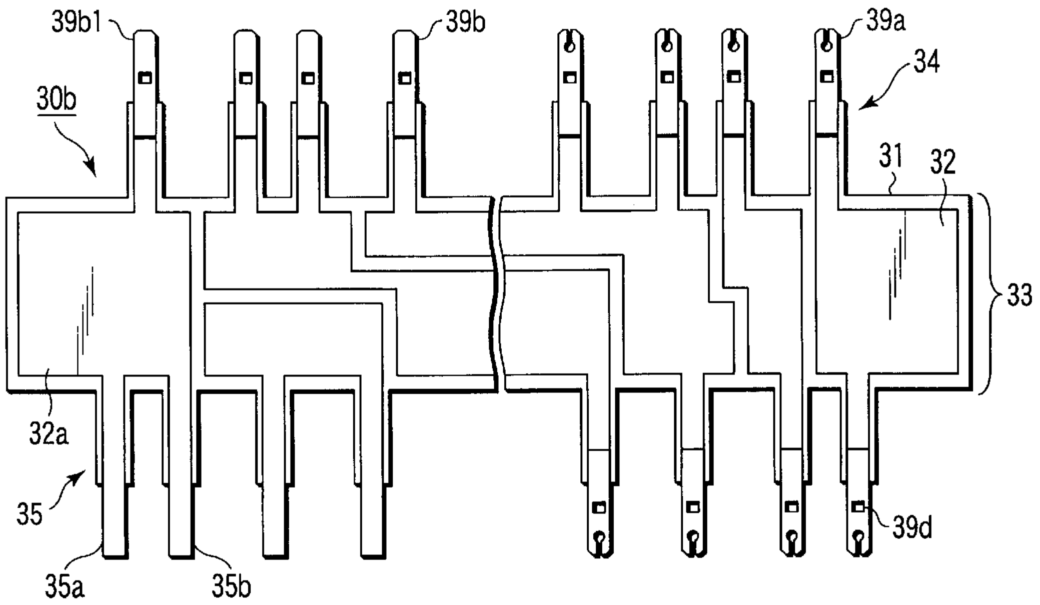
FIGS. 12A and 12B are top plan views of the FPC constituting a part of a cable.
Figure 12B:
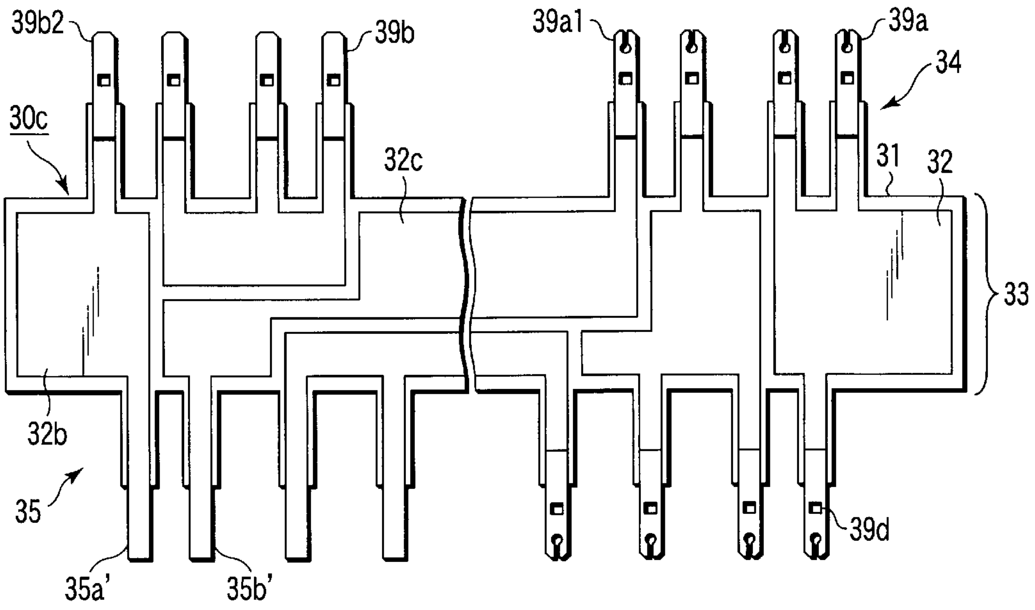

In this manner, the circuit connecting portions 35 of the respective FPCs 30*b*, 30*c* can conduct electricity through the desired circuit portions 32 on the FPCs 30*b*, 30*c*. A so-called interlayer connection between both the FPCs 30*b*, 30*c* and the wiring circuit constituted over the junction box main body 10 and connector portion 20 can freely be changed. For example, as shown in FIG. 11, when the circuit portion 32 of the circuit connecting portion 35*a* of the FPC 30*b* is connected to the circuit portion 32 of the circuit connecting portion 35*a*' of the FPC 30*c*, as shown in FIGS. 12A and 12B, the second connecting terminal 39*b*1 of the FPC 30*b* and the second connecting terminal 39*b*2 of the FPC 30*c* can constitute one circuit.

On the other hand, for example, when a circuit connecting portion 35*b* of the FPC 30*b* is connected to a circuit connecting portion 35*b*' of the FPC 30*c*, the second connecting terminal **39*b*1 of the FPC 30*b* is electrically connected to the first connecting terminal 39*a*1 of the FPC 30*c*. Therefore, the circuit portion 32*a* of the FPC 30*b* and the circuit portion 32*c* of the FPC 30*c* can constitute one circuit. In this manner, by the connection of the circuit portions 32 in the circuit connecting portions 35 of the respective FPCs 30*b*, 30*c*, the circuit mode of the circuit portion 32 can be changed to a desired mode. For example, when the interlayer connection is performed, many circuit portions 32 are formed on one FPC 30*b* (30*c*) and this high-density wiring is possible. Moreover, thereby, the number of layers is decreased, and weight saving can be promoted. Furthermore, the circuit mode of the circuit portion 32 by the circuit connecting portions 35** is changed in accordance with various uses. Thereby, the design change of the circuit is facilitated, and the circuit application range can be broadened. Therefore, it can be expected that the freedom degree of wiring design of the junction box is rapidly enhanced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A junction box comprising:

a junction box main body to which an electric component to be connected is attached;

a connector portion which connects a connector of an outer wiring circuit and a joint connector of a circuit distribution wiring circuit and is formed separately from said junction box main body; and a cable portion which is constituted of a flexible printed circuit with a circuit portion including a conductor pattern formed on an insulating film, and electrically connects said junction box main body to said connector portion, wherein said flexible printed circuit includes: a strip portion which connects said junction box main body to said connector portion; and a terminal connecting portion extending from a side edge of a position of the strip portion in which said junction box main body and connector portion are arranged in a short direction of said strip portion, said junction box main body includes: a junction box housing including a component attachment port to which said electric component to be connected is attached; and a plate-shaped first connecting terminal which is connected to the terminal connecting portion of said flexible printed circuit and contained in said junction box housing so as to be connected to said electric component to be connected, and said connector portion includes: a connector housing which is engaged with at least one of the connector of said outer wiring circuit and the joint connector of said circuit distribution wiring circuit; a plate-shaped second connecting terminal which is connected to the terminal connecting portion of said flexible printed circuit and contained in said connector housing so as to be connected to the connector of said outer wiring circuit; and a plate-shaped third connecting terminal which is connected to the terminal connecting portion of said flexible printed circuit and contained in said connector housing so as to be connected to the joint connector of said circuit distribution wiring circuit.

2. The junction box according to claim 1, wherein said second and third connecting terminals are formed in the same shape and are plate-shaped connecting terminals.

3. The junction box according to claim 1, wherein a plurality of terminal connecting portions of said flexible printed circuit are formed to extend from opposite side edges of said strip portion.

4. The junction box according to claim 1, wherein a plurality of said flexible printed circuits of said cable portion are superimposed upon one another in a non-bonded state so that said terminal connecting portions of the respective flexible printed circuits are arranged in positions with the first connecting terminal in said junction box main body and the second and third connecting terminals in said connector portion arranged therein.

5. The junction box according to claim 1, wherein said joint connector includes the circuit distribution wiring circuit which electrically connects the circuit portion formed in said flexible printed circuit in a desired circuit mode, and a terminal portion of the circuit distribution wiring circuit includes a connecting terminal connecting portion connected to said third connecting terminal.

6. The junction box according to claim 5, wherein said joint connector further includes an interlayer connection function of electrically connecting the circuit portions formed in a plurality of said flexible printed circuits in desired circuit modes.

7. The junction box according to claim 1, wherein said connector housing includes a lance mechanism which is formed to lock/fix said second and third connecting terminals inside the connector housing.

8. The junction box according to claim 1, wherein said first to third connecting terminals are connected to said terminal connecting portions by resistance welding, ultrasonic welding, laser welding or soldering.

9. The junction box according to claim 1, wherein connected portions of said first to third connecting terminals to said terminal connecting portions are sealed by a resin mold portion.

10. The junction box according to claim 1, wherein said junction box housing includes a lance mechanism which is formed to lock/fix said first connecting terminal inside the junction box housing.

11. The junction box according to claim 1, wherein said connector portion is attached to said connector housing in an attachable/detachable manner, and said connector portion further includes a case portion in which at least a part of the flexible printed circuit is contained.

12. A junction box comprising:

a junction box main body to which an electric component to be connected is attached;

a connector portion which connects a connector of an outer wiring circuit and is formed separately from said junction box main body; and a cable portion which is constituted of a flexible printed circuit with a circuit portion including a conductor pattern formed on an insulating film, and electrically connects said junction box main body to said connector portion, wherein said flexible printed circuit includes: a strip portion which connects said junction box main body to said connector portion; and a terminal connecting portion and circuit connecting portion extending from a side edge of a position of the strip portion in which said junction box main body and connector portion are arranged in a short direction of said strip portion, said junction box main body includes: a junction box housing including a component attachment port to which said electric component to be connected is attached; and a plate-shaped first connecting terminal which is connected to the terminal connecting portion of said flexible printed circuit and contained in said junction box housing so as to be connected to said electric component to be connected, said connector portion includes: a connector housing engaged with a connector of said outer wiring circuit; and a plate-shaped second connecting terminal which is connected to the terminal connecting portion of said flexible printed circuit and contained in said connector housing so as to be connected to the connector of said outer wiring circuit; and a plurality of circuit connecting portions of said flexible printed circuit are connected to form a desired circuit portion.

13. The junction box according to claim 12, wherein said first to third connecting terminals are connected to said terminal connecting portions by resistance welding, ultrasonic welding, laser welding or soldering.

14. The junction box according to claim 12, wherein a tip end of said circuit connecting portion in an extending direction is formed in a state in which only the circuit portion including said conductor pattern is exposed.

15. The junction box according to claim 12, wherein said plurality of circuit connecting portions are connected by resistance welding, ultrasonic welding, laser welding or soldering.

16. The junction box according to claim 12, wherein a plurality of terminal connecting portions of said flexible printed circuit are formed to extend from at least one side edge of said strip portion, and a plurality of circuit connecting portions are formed to extend only from one side edge of said strip portion.

17. The junction box according to claim 12, wherein a plurality of said flexible printed circuits of said cable portion are superimposed upon one another in a non-bonded state so that said terminal connecting portions of the respective flexible printed circuits are arranged in positions with the first connecting terminal in said junction box main body and the second connecting terminal in said connector portion arranged therein, and said circuit connecting portions are superimposed and arranged in a thickness direction of said flexible printed circuits so as to form the desired circuit portion.

18. The junction box according to claim 12, wherein connected portions of said first to third connecting terminals and said terminal connecting portions are sealed by a resin mold portion.

19. The junction box according to claim 17, wherein a plurality of circuit connecting portions formed in a plurality of said flexible printed circuits of said cable portion are subjected to interlayer connection, so that said circuit portion is electrically connected in a desired circuit mode.

20. The junction box according to claim 12, wherein said junction box housing includes a lance mechanism which is formed to lock/fix said first connecting terminal inside the junction box housing.

21. The junction box according to claim 12, wherein said connector housing includes a lance mechanism which is formed to lock/fix said second connecting terminal inside the connector housing.

22. The junction box according to claim 12, wherein said connector portion is attached to said connector housing in an attachable/detachable manner, and further includes a case portion in which at least a part of said flexible printed circuit is contained.

* * * * *